(12) United States Patent
Oruganty et al.

(10) Patent No.: US 11,769,881 B1
(45) Date of Patent: Sep. 26, 2023

(54) ION-BASED ELECTROCHEMICAL CELL FORMULATIONS AND METHODS OF PREPARATION THEREOF

(71) Applicants: Srigouri Oruganty, Reading, PA (US); Roxsonna Janiszewski, Temple, PA (US)

(72) Inventors: Srigouri Oruganty, Reading, PA (US); Roxsonna Janiszewski, Temple, PA (US)

( * ) Notice: Subject to any disclaimer, the term of this patent is extended or adjusted under 35 U.S.C. 154(b) by 10 days.

(21) Appl. No.: 17/674,732

(22) Filed: Feb. 17, 2022

(51) Int. Cl.
*H01M 4/60* (2006.01)
*H01M 10/0564* (2010.01)
*H01M 4/02* (2006.01)

(52) U.S. Cl.
CPC ......... *H01M 4/60* (2013.01); *H01M 10/0564* (2013.01); *H01M 2004/027* (2013.01); *H01M 2004/028* (2013.01)

(58) Field of Classification Search
CPC ............... H01M 4/60; H01M 10/0564; H01M 2004/027; H01M 2004/028
See application file for complete search history.

(56) References Cited

U.S. PATENT DOCUMENTS

| | | | | |
|---|---|---|---|---|
| 2001/0000484 A1* | 4/2001 | Lv | ............................ | H01M 4/32 29/623.5 |
| 2001/0051125 A1* | 12/2001 | Watanabe | ......... | H01M 10/0568 429/303 |
| 2010/0237298 A1* | 9/2010 | Armand | ................ | H01M 4/606 564/252 |
| 2012/0315553 A1* | 12/2012 | Mizuno | ............. | H01M 10/0568 429/339 |
| 2013/0189571 A1* | 7/2013 | Abouimrane | ........... | H01M 4/60 429/188 |

OTHER PUBLICATIONS

Amdursky, N. et al., "Solid-state electron transport via cytochrome c depends on electronic coupling to electrodes and across the protein," PNAS, Aug. 15, 2014, 111(15):5556-5561.
Annopkumar, V., "Potassium-Ion Batteries: Key to Future Large-Scale Energy Storage?" ACS Appl. Energy Mater. 2020, 3:9478-9492.
Enterococcus faecium (Orla-Jensen) Schleifer and Kilpper-Balz, ATCC, retrieved on May 30, 2022 from the internet at https://www.atc.org/products/19434#culturemethod, 1-9.
Bhat, S. et al., "Viscoelasticity in Biological Systems: A Special Focus on Microbes," Intech, 2012, 124-156.
Bresser, D. et al., "Alternative binders for sustainable electrochemical energy storage—the transition to aqueous electrode processing and bio-derived polymers," Energy Environ. Sci., 2018, 11:3096-3127.

(Continued)

*Primary Examiner* — Helen Oi K Conley
(74) *Attorney, Agent, or Firm* — COOLEY LLP

(57) ABSTRACT

An organic electrochemical cell includes a cathode including a quinone compound, an anode including dipotassium terephthalate, an electrolyte, and a separator disposed between the anode and the cathode, the organic electrochemical cell configured such that, during a discharging operation, potassium ions travel through the separator and the electrolyte to the cathode.

19 Claims, 9 Drawing Sheets

(56) References Cited

OTHER PUBLICATIONS

Chen, H. et al., "A mechanically robust self-healing binder for silicon anode in lithium ion batteries," Nano Energy, 2021, 81(105654):1-9.

Cho, H. et al., "Partially Carbonized Poly (Acrylic Acid) Grafted to Carboxymethyl Cellulose as an Advanced Binder for Si Anode in Li-ion Batteries," J. Electrochem. Sci. Technol., 2019, 10(2):131-138.

Components 101, "Battery Separators—Types and Importance in the Performance of Battery (/articles/battery-separators-types-and-importance)," Nov. 25, 2019, retrieved from internet at https://components101.com/articles/battery-seperators-types-and-importance, 1-11.

Deng, et al., "Organic Potassium Terephthalate ($K_2C_8H_4O_4$) with Stable Lattice Structure Exhibits Excellent Cyclic and Rate Capability in Li-ion Batteries," Electrochimica Acta, 2016, 222:1086-1093.

Esquivel, J.P. et al., "A Metal-Free and Biotically Degradable Battery for Portable Single-Use Applications," Adv. Energy Mater., 2017, 7(1700275):1-11.

Guin, P. et al., "Electrochemical Reduction of Quinones in Different Media: A Review," International Journal of Electrochemistry, 2010, 2011(816202):1-22.

Han C., et al., "Organic quinones towards advanced electrochemical energy storage: recent advances and challenges," J. Mater. Chem. A., 2019, 7:23378-23415.

Hess, S. et al., "Flammability of Li-Ion Battery Electrolytes: Flash Point and Self-Extinguishing Time Measurements," Journal of The Electrochemical Society, 2015, 162(2):A3084-A3097.

Hsu, T-H. et al., "Effects of Graphene Nanosheets with Different Lateral Sizes as Conductive Additives on the Electrochemical Performance of $LiNi_{0.5}Co_{0.2}O_2$ Cathode Materials for Li Ion Batteries," Polymers 2020, 12(1162):1-13.

Huang, J. et al., "Mesoscopic to Macroscopic Electron Transfer by Hopping in a Crystal Network of Cytochromes," J. Am. Chem. Soc., 2020, 142:10459-10467.

Huang, W. et al., "Quasi-Solid-State Rechargeable Lithium-Ion Batteries with a Calix[4]quinone Cathode and Gel Polymer Electrolyte," Angew. Chem. Int. Ed. 2013, 52:9162-9166.

Kim, Y. et al., "Mechanistic Study on Electrochemical Reduction of Calix[4]quinone in Acetonitrile Containing Water," J. Phys. Chem. B, 2004, 108:4927-4936.

Lakraychi, A. et al., "Organic Batteries—the route towards sustainable electrical energy storage technologies," Institut de la Matière Condensée et des Nanosciences (IMCN), Université catholique de Louvain, Place L. Pasteur 1, 1348 Louvain-la-Neuve, Belgium, Chimie Nouvelle No. 127, Jan. 2018, 1-9.

Liao, J. et al., "A potassium-rich iron hexacyanoferrate/dipotassium terephthalate@ carbon nanotube composite used for K-ion full-cells with an optimized electrolyte," J. Mater. Chem. A, 2017, 5:19017-19024.

Question: How do I calculate the theoretical capacity of a cathode material (LiMn1.5Ni0.5O4) for a lithium ion battery? Retrieved from the internet on May 30, 2022 at https://www.researchgate.net/post/How-do-I-calculate-the-theoretical-capacity-of-a-cathode-material-LiMn15Ni05O4-for-lithium-ion-battery, 1-14.

Liu, C. et al., "Understanding electrochemical potentials of cathode materials in rechargeable batteries," Materials Today, Mar. 2016, 19(2):109-123.

Matos, R., et al., "Approaches for Calculating Solvation Free Energies and Enthalpies Demonstrated with an Update of the FreeSolv Database," J. Chem. Eng. Data, 2017, 62:1559-1569.

Mauger, A. et al., "Recent Progress on Organic Electrodes Materials for Rechargeable Batteries and Supercapacitors," Materials, 2019, 12(1770):1-57.

Miao L. et al., "The structure-electrochemical property relationship of quinone electrodes for lithium-ion batteries," Phys.Chem.Chem. Phys., 2018, 20:13478-13484.

Nagulapati, V.M. et al., "Enhancing the Electrochemical Performance of SbTe Bimetallic Anodes for High-Performance Sodium-Ion Batteries: Roles of the Binder and Carbon Support Matrix," Aug. 7, 2019, 9(1134):1-17.

Newton, et al., "Analyses of Current-Generating Mechanisms of *Shewanella loihica* PV-4 and *Shewanella oneidensis* MR-1 in Microbial Fuel Cells," American Society for Microbiology Applied and Environmental Microbiology, Dec. 15, 2009, 75(24):7674-7681.

Parikh, P. et al., "Role of Polyacrylic Acid (PAA) Binder on the Solid Electrolyte Interphase in Silicon Anodes," Chem. Mater. 2019, 31:2535-2544.

Patti, et al., "Characterization of the Peptidoglycan of Vancomycin-Susceptible Enterococcus faecium," Biochemistry, 2008, 47:8378-8385.

PubChem CID 366285, Calix(4)quinone Compound Summary, Molecular Formula $C_{28}H_{16}O_8$, modified May 28, 2022, 1-14.

PubChem CID 4650, 1,4-Benzoquinone Compound Summary, Molecular Formula $C_6H_4O_2$, modified May 28, 2022, 1-61.

PubChem CID 6581, Acrylic acid Compound Summary, Molecular Formula $CH_2CHCOOH$, modified May 28, 2022, 1-78.

Shewanella oneidensis Venkateswaran et al., Product category: Bacteria, Strain designation: MR-1 [CIP 106686], ATCC 2022, 1-8.

Thwaites, J.J et al., "Mechanical properties of peptidoglycan as determined from bacterial thread," Int. J. Biol. Macromol., Aug. 1989, 11:201-206.

Ulvestad, A. "A Brief Review of Current Lithium Ion Battery Technology and Potential Solid State Battery Technologies," 1-17.

Vollmer, W. et al., "Peptidoglycan structure and architecture," FEMS Microbiol Rev, 2008, 32:149-167.

Wang, H. et al., "Electrolyte Chemistry Enables Simultaneous Stabilization of Potassium Metal and Alloying Anode for Potassium-Ion Batteries," Angew. Chem. Int. Ed., 2019, 58:16451-16455.

Wang, X. et al., Combining Quinone Cathode and Ionic Liquid Electrolyte for Organic Sodium-Ion Batteries, Feb. 14, 2019, Chem 5:364-375.

Wu, J. et al., "Synergy of binders and electrolytes in enabling microsized alloy anodes for high performance potassium-ion batteries," Nano Energy, 2020, 77(105118):1-10.

Zhang, W. et al., "Approaching high-performance potassium-ion batteries via advanced design strategies and engineering," Sci. Adv., May 10, 2019:5(eaav7412):1-13.

Zheng, S. et al., "An inorganic-organic nanocomposite calix[4]quinone (C4Q)/CMK-3 as a cathode material for high-capacity sodium batteries," Inorg. Chem. Front., 2017, 4:1806-1812.

\* cited by examiner

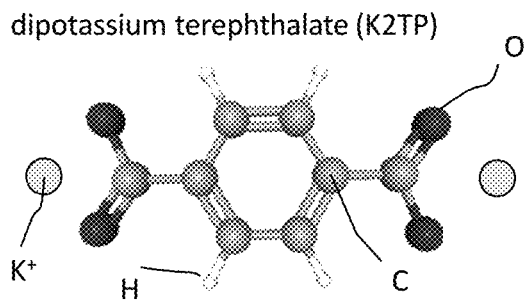
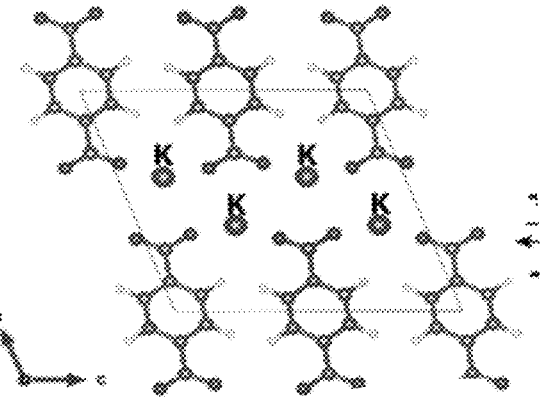
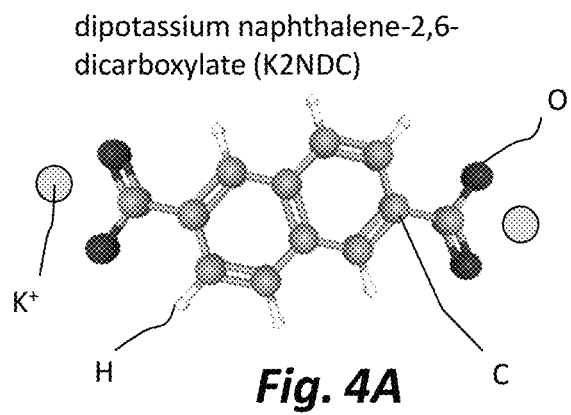
*Fig. 4A*
*Fig. 4B*
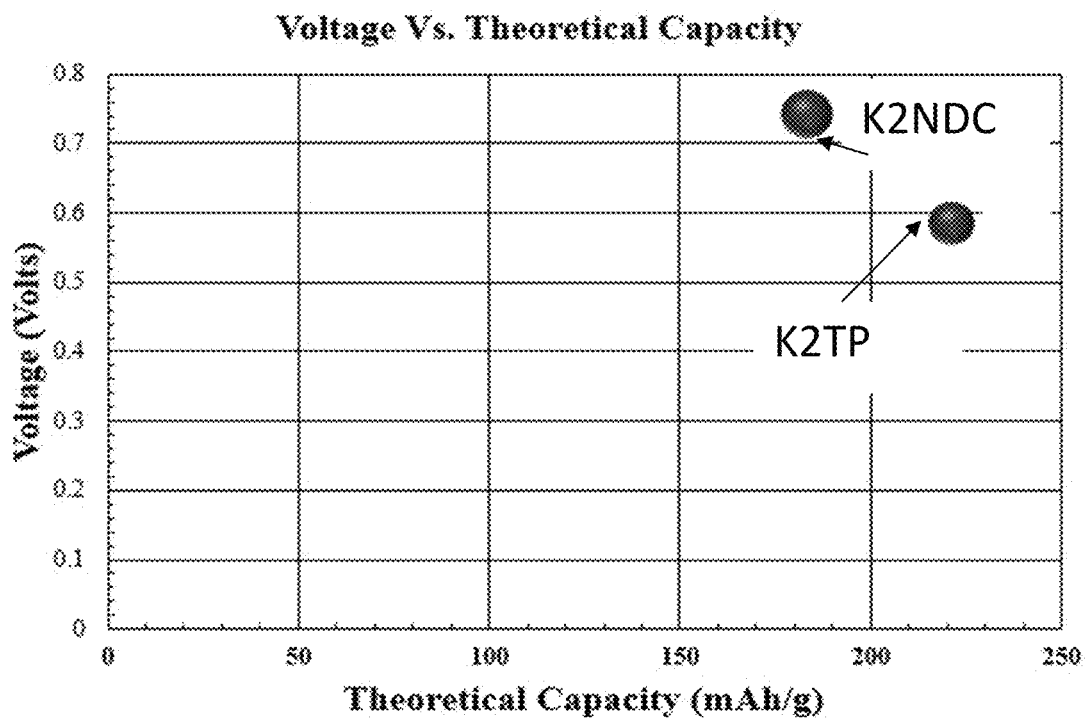
*Fig. 4C*

1,4-Benzoquinone $C_{11}H_{20}F_6N_2O_4S_2$

| Element | Case α | Case β | Case γ | Case δ | Case ε |
|---|---|---|---|---|---|
| Cathode current collector | Aluminum | Aluminum | Aluminum | Cytochrome c | Cytochrome c |
| Anode current collector | Copper | Copper | Copper | Cytochrome c | Cytochrome c |
| Electrolyte | PY13-TFSI | PY13-TFSI | PP13-TFSI | PP13-TFSI | PP13-TFSI |
| Binder | Carboxymethyl cellulose-PAA | Carboxymethyl cellulose-PAA | Peptidoglycan-Polyacrylic Acid Biopolymer | Peptidoglycan-Polyacrylic Acid Biopolymer | Peptidoglycan-Polyacrylic Acid Biopolymer |
| Cathode | Calix[4]quinone | Calix[4]quinone | Benzoquinone | Benzoquinone | Benzoquinone |
| Anode | Disodium Terephthalate | Dipotassium terephthalate | Dipotassium terephthalate | Dipotassium terephthalate | Dipotassium terephthalate and graphene nanocomposite material |
| Separator | Polyolefin | Polyolefin | Polyolefin | Polyolefin | Polyolefin |
| Ions | Sodium Na | Potassium K | K | K | K |

*Fig. 9*

ION-BASED ELECTROCHEMICAL CELL FORMULATIONS AND METHODS OF PREPARATION THEREOF

TECHNICAL FIELD

The present disclosure relates generally to ion-based electrochemical cells and, more particularly, to biodegradable ion-based electrochemical cells.

BACKGROUND

Lithium-ion batteries have revolutionized peoples' everyday lives, laying the foundations for a wireless and interconnected society. Currently, lithium-ion batteries are the most efficient batteries and can be found in portable electronics such as laptops, mobile phones, tablets, etc. Although lithium-ion batteries are able to be recycled, their disposal is still a concern. For example, during a two-year time period in Europe, the collected data showed that of the 65,500 tons of lithium-ion batteries that were produced, a mere 1,900 tons were recycled, which is approximately 2.9% of the total number of lithium-ion batteries produced within this period. Typically, the non-recycled parts are discarded into landfills, and such practice frequently leads to hazardous materials leaking into the environment. Further, lithium-ion batteries contribute to electronic waste (e-waste) and contain materials that take considerably long periods of time to break down and decay, meaning they will not biodegrade in the foreseeable future.

Further, due to an increase in the demand for lithium batteries and due to lithium in lithium batteries not being fully recycled, the world's supply of lithium is being depleted. With the increases in use of electric vehicles, the supply of lithium may run out within the century.

With the demand for batteries rising and the supply of lithium dwindling, organic batteries present a more effective and environmentally friendly solution. The increasing use of organic electrochemical cells (or batteries) underscores the importance of using non-toxic materials and processes that refrain from harming the environment. Further, multitudes of organic compounds that may be used to form organic batteries allow for experimentation with the sizes and shapes of these batteries. Therefore, paper-thin, or even flexible designs of organic batteries may be achievable in the future. Furthermore, organic batteries can be designed to be cost-effective and may be fabricated from abundant and easily obtainable materials. For example, the battery's separator, polyolefin, can be obtained from polypropylene, polyethylene, or through laminating both of the materials. While it is generally understood that organic batteries are the future of battery technology, there is still a pressing need for a design of organic batteries that are recyclable, include non-toxic materials, and have storage and power characteristics comparable to lithium-ion batteries.

SUMMARY

Consistent with a disclosed embodiment, an organic electrochemical cell includes a cathode including a quinone compound, an anode including dipotassium terephthalate, an electrolyte, and a separator disposed between the anode and the cathode, the organic electrochemical cell configured such that, during a discharging operation, potassium ions travel through the separator and the electrolyte to the cathode.

Consistent with another disclosed embodiment, an organic electrochemical cell includes a cathode including a quinone compound, an anode including dipotassium terephthalate, an electrolyte, a separator disposed between the anode and the cathode, and a binder including peptidoglycan-polyacrylic acid biopolymer. Also, at least one of the anode or the cathode of the organic electrochemical cell includes the binder. Further, the organic electrochemical cell includes a cathode current collector, an anode current collector, where each of the cathode current collector and the anode current collector includes a cytochrome complex. The organic electrochemical cell is configured such that, during a discharging operation, potassium ions travel through the separator and the electrolyte to the cathode.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A and 4B shows a molecular structure of example anode material for an organic electrochemical cell, as shown in FIG. 2, according to an embodiment.

FIG. 4C is a data plot of redox potential vs. theoretical capacity for various materials that may be used to form an anode of an organic electrochemical cell, according to an embodiment.

FIG. 9 is a table listing possible example embodiments (cases α-∈) of an organic electrochemical cell, according to various embodiments.

DETAILED DESCRIPTION

The present disclosure addresses the problem of designing organic electrochemical cells (or batteries) that are non-toxic and recyclable. In particular, the present disclosure describes organic, non-toxic materials that can be used for designing organic electrochemical cells with electrical characteristics comparable or superior to lithium-ion electrochemical cells.

Figure 1:
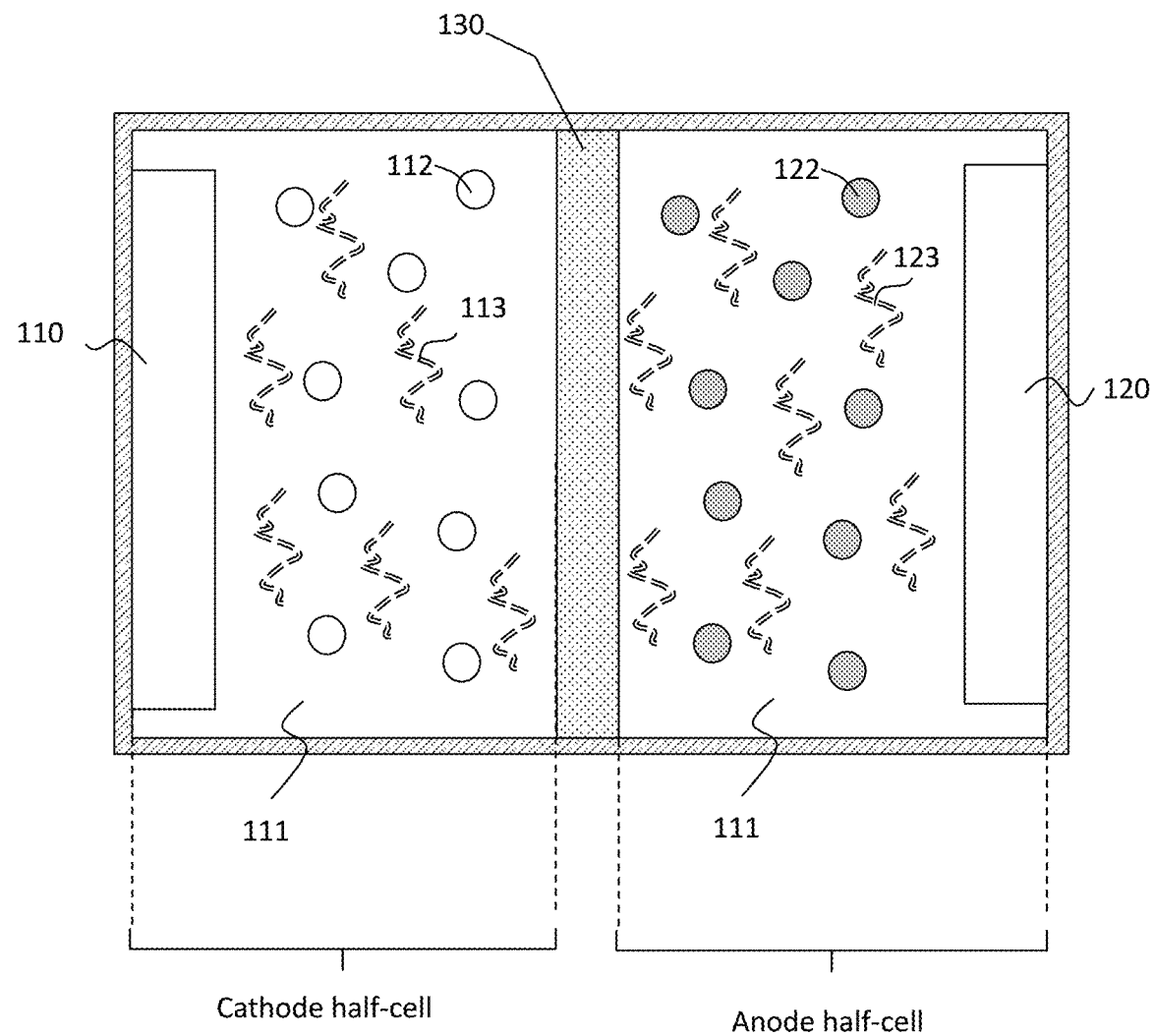
FIG. 1 is an example organic electrochemical cell, according to an embodiment.

Aspects of the present disclosure are related to an organic electrochemical cell formed from materials that include organic compounds. In an example embodiment, an electrochemical cell is referred to be "organic" if at least one element of the electrochemical cell is formed from organic material, or from a composite material containing an organic material. In some cases, the organic compounds can be biodegradable, and may be environmentally friendly (e.g., may be easily recycled or may naturally biodegrade). An example embodiment of an organic electrochemical cell (OEC) 100 is shown in FIG. 1. OEC 100 includes a cathode current collector 110 and an anode current collector 120. Further, FIG. 1 shows a cathode 112 and anode 122 dissolved in an electrolyte 111. In an example implementation of OEC 100, electrolyte 111 may include a binder 113 on the cathode side and a binder 123 on the anode side. In various implementations, binders 113 and 123 may be formed from the same material. In various implementations, OEC 100 includes a separator 130 separating a cathode half-cell from an anode half-cell. In various embodiments, anode current collector 120 is adjacent to anode 122, and cathode current collector 110 is adjacent to cathode 112. Further, anode current collector 120 is located in an anode half-cell of OEC 100, and cathode current collector 110 is located in the cathode half-cell of OEC 100.

In some implementations, cathode 112 and electrolyte 111 may be combined into a slurry and then coated onto cathode current collector 110, while anode 122 and electrolyte 111 may be combined into a slurry and coated onto anode current collector 120. Such implementations ensure that there are no liquid materials found within an ion electrochemical cell, thereby preventing leakage from the electrochemical cell.

In an example implementation, anode current collector 120 may be made from carbon/graphite coated or otherwise deposited onto a copper current collector. In another implementation, the copper current collector may be used without any coatings. Alternatively, the copper current collector may be coated with a layer of cytochrome c (cytochrome complex being rich in heme), as further described below in more detail. In other implementations, graphite can be used for the current collector with a cytochrome c coating. Depending on an electrode material for anode current collector 120, the layer of cytochrome c may be coated as a biofilm upon the cathode current collector and form ionic interactions (e.g., cytochrome c may be coated as a biofilm upon graphite and form ionic bonds), and such a coating may improve the performance of anode current collector 120.

Further, similar to anode current collector 120, cathode current collector 110 may be made from metals, carbon-based structures, or redox active biological materials. In some cases, carbon-based structures or redox active biological materials may be coated or otherwise deposited onto an aluminum current collector. In another implementation, the aluminum current collector may be used without any coatings. In some cases, the aluminum current collector may be coated with a layer of cytochrome c, as further described below. Further, in some implementations, graphite can be used for the cathode current collector 110 with a cytochrome c coating. Depending on an electrode material for cathode current collector 110, the layer of cytochrome c may be coated as a biofilm upon the cathode current collector and form ionic attractions (e.g., cytochrome c may be layered as a biofilm upon graphite and form ionic bonds), and such layering may improve the performance of cathode current collector 110. In an example implementation of OEC 100, cathode 112 of OEC 100 is formed from a quinone compound. For example, quinone compounds may include calix [4]quinone, anthraquinone (e.g., 2,3-anthraquinone), naphthodiquinone (e.g., 1,4,5,8-naphthodiquinone), a benzoquinone (e.g., 1,4-benzoquinone), 9,10-phenanthroquinone (9,10-PQ), 5,12-napthacenquinone (NAQ), 1,4-hydroquinone (1,4-HQ), poly(2,3-dithiino-1,4-benzoquinone) (PDB), poly(2,5-Dihydroxy-1,4-Benzoquinonyl Sulfide) (PDBS), and the like.

In an example implementation of OEC 100, anode 122 is formed from an organic compound containing potassium (K) or sodium (Na). For example, anode 122 may be formed from a dipotassium terephthalate (K2TP) or disodium terephthalate (Na2TP). Alternatively, in some implementations, anode 122 may be formed from other organic compounds containing potassium or sodium, such as, for example, dipotassium naphthalene-2,6-dicarboxylate (K2NDC), graphite, dipotassium 2,5-pyridinedicarboxylate (K2PC), dipotassium 1,1'-biphenyl-4,4'-dicarboxylate (K2BPDC), dipotassium 4,4'-E-stilbenedicarboxylate (K2SBDC), and the like.

Further, electrolyte 111 may be selected based on the type of material chosen for cathode 112 and anode 122. In an example implementation, electrolyte 111 may be selected such that a solvation energy is sufficiently high (e.g., solvation energy for electrolyte 111 may be above 2 electron-volts (eV), above 3 eV, above 4 eV, above 5 eV, above 6 eV, above 7 eV, above 8 eV, above 9 eV, above 10 eV, above 11 eV, and the like. In an example implementation, electrolyte 111 may be a n-methyl-n-propylpiperidinium bis(trifluoromethanesulfonyl)imide (PP13-TFSI), n-methyl-n-propylpyrrolidinium bis(trifluoromethanesulfonyl)imid (PY13-TFSI), or any other suitable ionic electrolytes, such as ionic liquid electrolytes. In various implementations, ionic electrolytes may have solvation energy that is sufficiently high (e.g., greater than 2 eV) such that ions (e.g., potassium ions or sodium ions) do not substantially react with the electrolyte. Relatively high solvation energy may improve operation of the electrochemical cell due to ions primarily being involved in the redox reaction (e.g., when ions are not engaged in other reactions, such as reactions with the electrolyte).

Separator 130 of OEC 100 may be a porous membrane and is configured to allow ions (e.g., potassium ions or sodium ions) to penetrate from one side of the organic electrochemical cell (e.g., from cathode half-cell to anode half-cell during charging of the organic electrochemical cell), while restricting the motion of electrons. In an example embodiment, separator 130 may be formed from any suitable material that allows propagation of ions and that does not adversely interact with electrolyte 111 (e.g., the material for separator 130 is selected such that it does not develop cracks, defects, and the like, when interacting with electrolyte 111, and when ions (or electrons) propagate through the material). In an example embodiment, separator 130 may be formed from polyolefin in the form of microporous polyolefin membranes. Polyolefin membranes are used for lithium-ion batteries and are known for their chemical and electrochemical stability, high mechanical strength, uniform pore size, and inexpensive manufacturing and materials cost. Further, separator 130 may include organic biopolymer compounds, such as cellulose, chitosan, agar, starch, and lignin-based separators. In an example embodiment, separators that are used for lithium-sulfur batteries can be used as separator 130 when implementing OEC 100. In some cases, glass-fiber membrane may be used as separator 130.

Binder 113 of OEC 100 is configured to perform multiple tasks, such as ensuring that coating particles for anode and cathode current collectors are adhering to the current collectors. Further, binder 113 improves the dispersion of cathode and anode particles in the electrolyte, mediates volume expansion of the cathode and anode half-cells, and/or prevents cracks that may form in the oxidized cathode 112 or anode 122 during the reduction processes. Also, binder 113 may mitigate thermal damage. For example, an overheating within cathode 112, and/or anode 122, which consequently causes overheating within other parts of the electrochemical cell, such as overheating of electrolytes 111 may alter the structure and the interaction between components of the electrochemical cell, thereby leading to the thermal damage.

In an example implementation, organic material for binder 130 is selected based on the type of ions used for the OEC 100. In some cases, organic material for binder 130 may include carbon-hydrogen strands (e.g., glycan strands) that improve the tensile strength of binder 130 while maintaining the needed flexibility of the binder material. In an example implementation, for sodium ions, binder 130 may be formed from carboxymethyl cellulose-polyacrylic acid biopolymer (CMC/PAA), and for potassium atoms, binder 130 may be formed from peptidoglycan-PAA—a component of cell walls in a bacteria (e.g., any gram-positive bacteria). Peptidoglycan has suitable elastic and mechanical properties (e.g., peptidoglycan has a low Young's modulus of 20 GPa (as a bacteria thread) and 0.025 GPa when measured immediately after isolating it from the cell wall, while having a high tensile strength of about 300 MPa). High tensile strength of peptidoglycan leads to an improved reduction in volume expansion of the cathode and anode half-cells.

Figure 2:
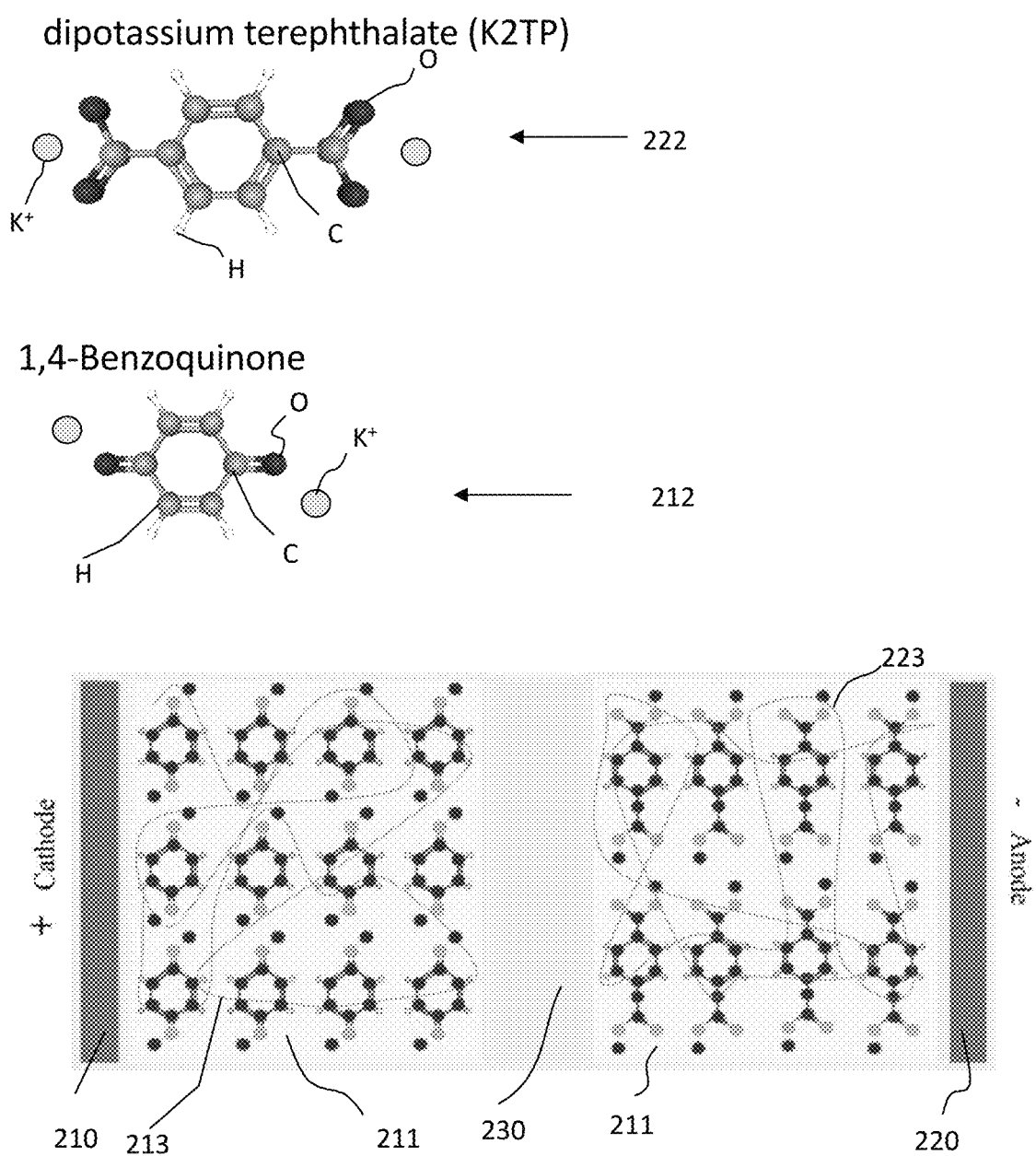
FIG. 2 is an example implementation of organic electrochemical cell, as shown in FIG. 1, according to an embodiment.
Figure 3:
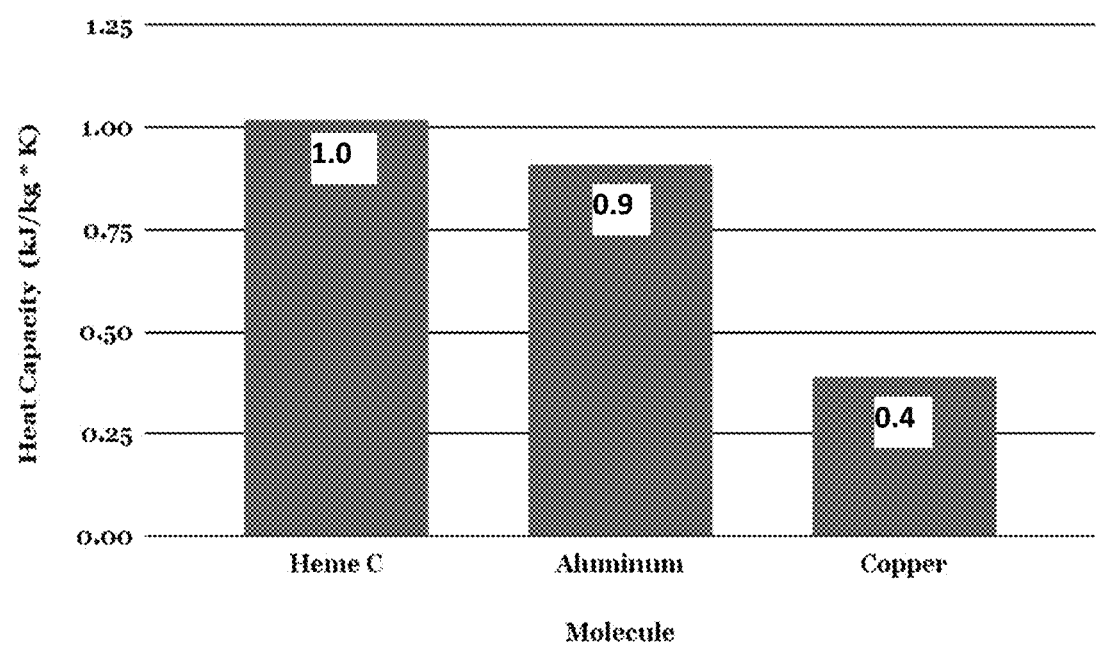
FIG. 3 is a data plot of heat capacity for materials that may be used to form an anode current collector or a cathode current collector, according to an embodiment.

FIG. 2 shows an example embodiment of an organic electrochemical cell (OEC) 200. OEC 200 includes a cathode current collector 210 formed from an aluminum current collector coated with cytochrome c. Cytochrome c is a heme protein that is localized in the compartment between the inner and outer mitochondrial membranes where it functions to transfer electrons between complex III and complex IV of the respiratory chain. Cytochrome c is functionally involved in the electron transport chain of mitochondria. The role of cytochrome c is to carry electrons from one complex of integral membrane proteins of the inner mitochondrial membrane to another; thus, cytochrome c acts as a conductor between membrane proteins. Cytochrome c protein includes heme C—the redox center of the protein. Heme C has a relatively high heat capacity of about 1 kJ/kg·K, indicating that cytochrome c may not overheat during the operation of the OEC 200. For example, FIG. 3 shows heat capacity for heme C, aluminum, and copper. The heat capacity is highest for heme C (about 1 kJ/kg·K) followed by the heat capacity for aluminum (about 0.9 kJ/kg·K) followed by the heat capacity for copper (about 0.4 kJ/kg·K). In various implementations, a suitable cytochrome c may be selected. For example, cytochrome c may be a tetraheme cytochrome complex. In some cases, tetraheme cytochrome c may be obtained from *shewanella oneidensis* bacteria. In an example implementation, MR-1 strain of *shewanella oneidensis* may be used.

Also, OEC 200 includes an anode current collector 220 formed from a copper current collector coated with cytochrome c. It should be noted that depending on a type of cytochrome c (e.g., different cytochrome c may have different number of hemes), and/or a particular structure of the cytochrome c (e.g., a location of hemes from a center of the cytochrome c), as well as a type and strength of bonding (e.g., ionic bonding) of the cytochrome c with the material of a current collector onto which the cytochrome c is coated, the resistivity of the cytochrome c may be varied, and tailored to fit the needs of an electrochemical cell. Further, as the purpose of the proposed electrochemical cell is to be environmentally friendly, the cytochrome c is a good candidate for such an electrochemical cell, as it requires no mining and is available in unlimited supply. It should be noted that depending on a type of cytochrome c (e.g., different cytochrome c may have different number of hemes), and/or a particular structure of the cytochrome c (e.g., a location of hemes from a center of the cytochrome c), as well as a type and strength of bonding (e.g., ionic bonding) of the cytochrome c with the material of a current collector onto which the cytochrome c is coated, the resistivity of the cytochrome c may be varied, and tailored to fit the needs of an electrochemical cell. Further, as the purpose of the proposed electrochemical cell is to be environmentally friendly, the cytochrome c is a good candidate for such an electrochemical cell, as it requires no mining and is available in unlimited supply.

Figure 6:
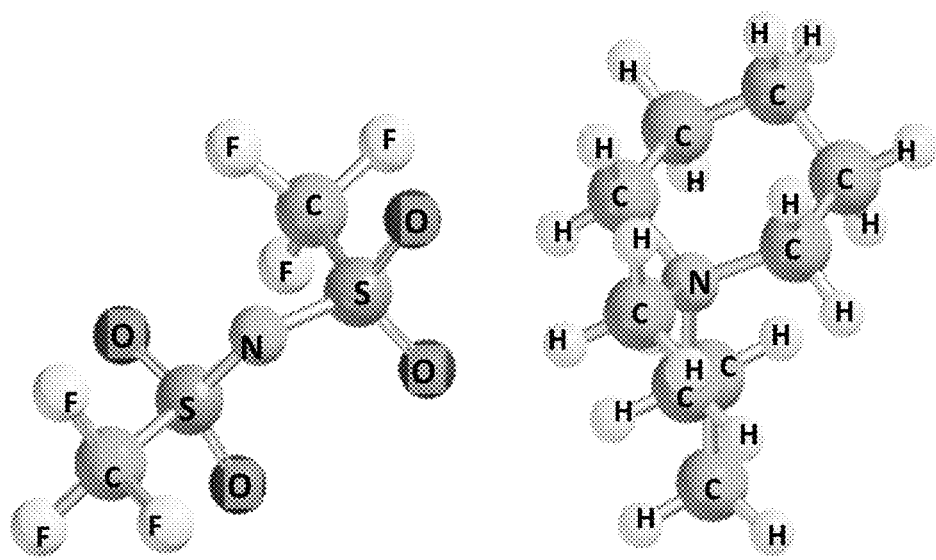
FIG. 6 is an example electrolyte material of an organic electrochemical cell, as shown in FIG. 2, according to an embodiment.

Further, in the embodiment of FIG. 2, for electrolyte 211 PP13-TFSI is selected (a molecular form of PP13-TFSI is shown in FIG. 6 and includes oxygen (O), carbon (C), iron (F), nitrogen (N), hydrogen (H), and Sulfur (S)). For a cathode 212, benzoquinone is selected, with an addition of two bonded potassium ions ($K^+$). For an anode 222, dipotassium terephthalate is selected. Each molecule of dipotassium terephthalate includes two bonded potassium ions ($K^+$). Additionally, a polyolefin membrane is selected for the separator 230, and a peptidoglycan-PAA is selected for the binders 213 and 223.

The selected materials are well suited for OEC 200 employing potassium ions. For example, dipotassium terephthalate (K2TP), shown in FIG. 4A (or FIG. 2), is a relatively small molecule as compared to, for example, dipotassium naphthalene-2,6-dicarboxylate (K2NDC), as shown in FIG. 4A. K2TP is configured to bind to two potassium ions. Due to the small size of the K2TP molecule, the theoretical capacity of anode 222 formed from K2TP is about 242 milliamperes per hour per gram (mAh/g). For example, an organic electrochemical cell having K2TP may produce about 242 milliamperes for a duration of an hour per gram of K2TP, which is relatively high for an organic compound. FIG. 4A shows a molecule of K2TP containing potassium (K), hydrogen (H), carbon (C), and oxygen (O). FIG. 4B shows an example of a two-dimensional lattice formed by molecules of K2TP.

FIG. 4C shows redox potential (measured in electronvolts (eV)) of K2TP and dipotassium naphthalene-2,6-dicarboxylate (K2NDC) as a function of theoretical capacity (measured in mAh/g). A lower value for redox potential may be preferable in some implementations, as this is the potential energy that needs to be overcome on the side of anode to release potassium ions. As seen from FIG. 4C, K2TP has a relatively low redox potential of 0.6 eV (lower than the redox potential for K2NDC of 0.74 eV), and has a relatively high theoretical capacity of about 242 mAh/g (higher than the theoretical capacity for K2NDC of about 180 mAh/g).

Figure 5A:
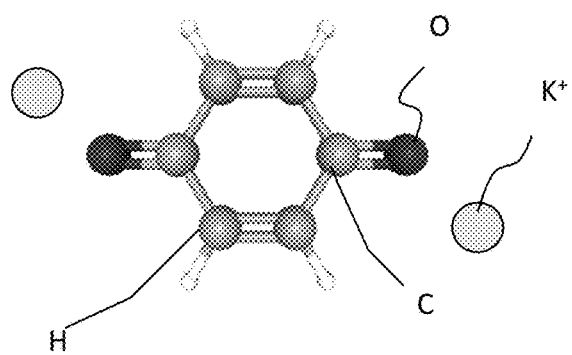
FIG. 5A is a molecular structure of an example cathode material of an organic electrochemical cell, as shown in FIG. 2, according to an embodiment.
Figure 5B:
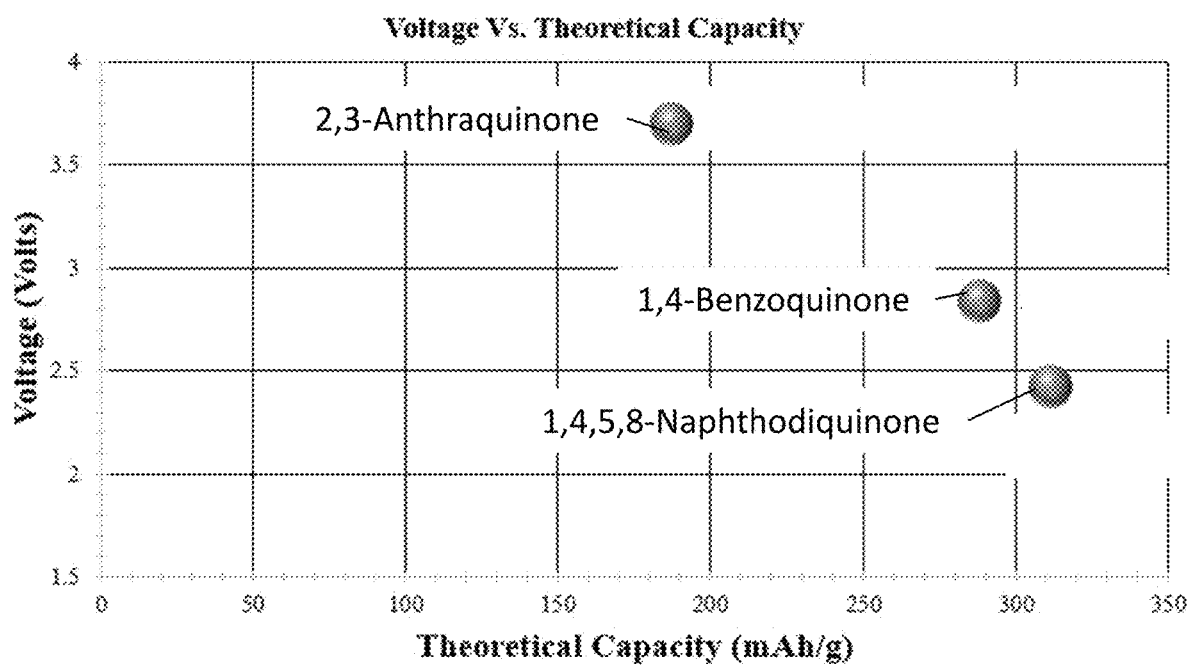
FIG. 5B is a data plot of redox potential vs. theoretical capacity for materials that may be used to form a cathode, according to an embodiment.

Similarly, cathode 212, formed from benzoquinone (a relatively small molecule, see FIG. 5A, as compared, for example, to calix[4]quinone, and configured to bind to two potassium ions), is configured to store a greater amount of charge that would otherwise be stored when using a larger molecule. A molecule of benzoquinone is shown in FIG. 5A and includes carbon (C), hydrogen (H), oxygen (O), and potassium (K). Additionally, FIG. 5B shows redox potential (measured in (eV)) of various quinone compounds as a function of theoretical capacity (measured in mAh/g). For cathode 212, a higher redox potential may be preferred for some implementations, as this is related to the energy released when potassium ions bond with benzoquinone. As seen from FIG. 5B, benzoquinone has a relatively high redox potential of 2.8 eV (higher than redox potential for naphthodiquinone 2.4 eV), and has a relatively high theoretical capacity of about 287 mAh/g (higher than the theoretical capacity for anthraquinone of about 180 mAh/g). Note that the highest redox potential is for anthraquinone (about 3.7 eV), and the highest theoretical capacity is for naphthodiquinone (about 310 mAh/g). Please note that an organic electrochemical cell's theoretical capacity may be limited by the theoretical capacity of K2TP. In an example implementation, a weight ratio of benzoquinone to K2TP may be selected to correspond to the ratio of theoretical energy density of K2TP to theoretical energy density of benzoquinone.

Figure 7:
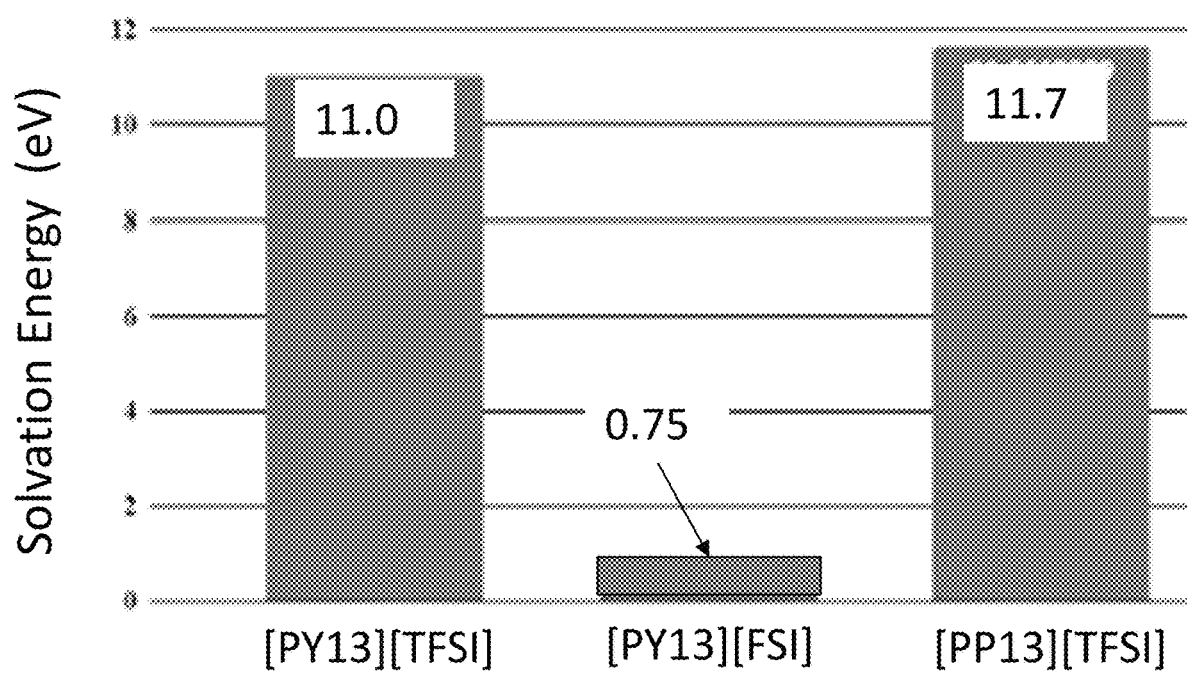
FIG. 7 is a data plot of solvation energy for different electrolytes, according to an embodiment.
Figure 8:
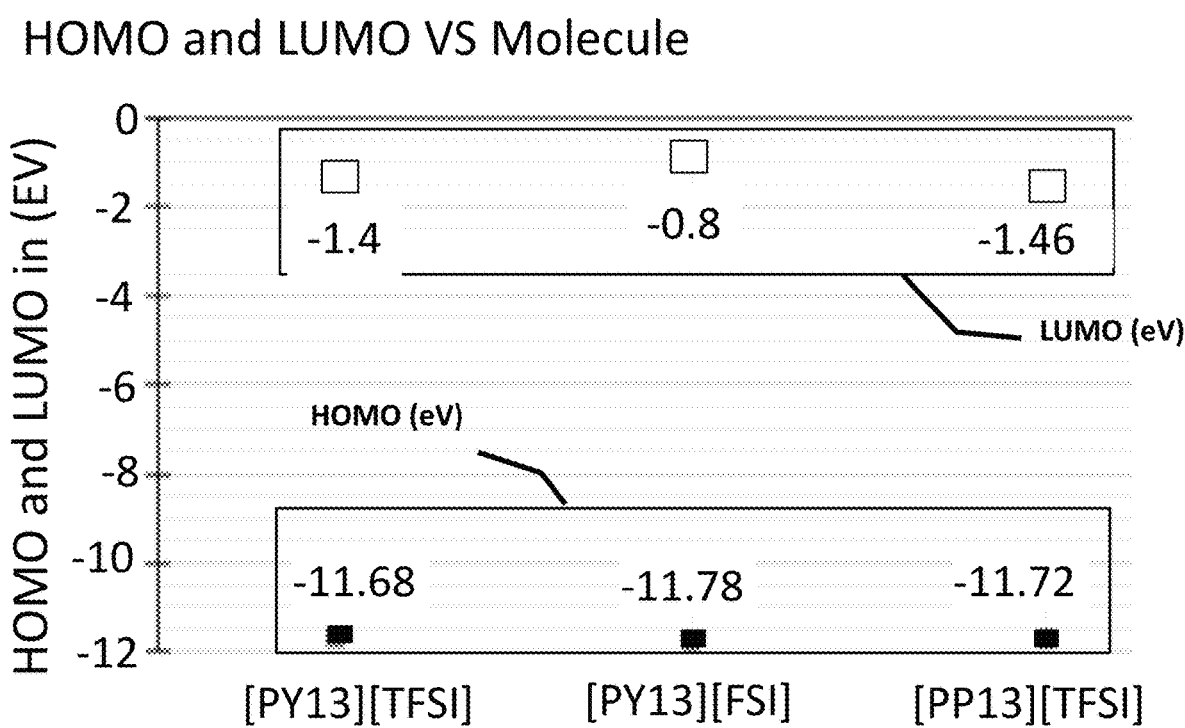
FIG. 8 is a data plot of highest occupied molecular orbital/lowest unoccupied molecular orbital (HOMO/LUMO) energies for different electrolytes, according to an embodiment.

The selection of PP13-TFSI for electrolytes 211 and 221 is, in part, determined by the solvation energy of PP13-TFSI. For an electrolyte, higher solvation energy leads to a decreased solvation of cathode 212 and anode 222 in the electrolyte. The high solvation energy may be favorable for some implementations of the electrochemical cell, as it might lead to reduced reactions between potassium ions and the electrolyte molecules. Further, a high solvation energy value associated with the lowest unoccupied molecular orbital (LUMO) of the electrolyte may be beneficial as it reduces the interaction of the electrolyte with various components of OEC 200. FIG. 7 shows solvation energies for different electrolyte molecules, with PP13-TFSI having the highest solvation energy (about 11.7 eV). As shown in FIG. 7, PY13-TFSI also has a high solvation energy (about 11.2 eV), while PY13-FSI has a low solvation energy of about 0.7 eV. Additionally, FIG. 8 shows the highest occupied molecular orbitals (HOMOs) and LUMOs for different electrolytes (electrolytes PP13-TFSI, PY13-TFSI, and PY13-FSI). Among all the electrolytes shown, PP13-TFSI has the lowest LUMO energy (about −1.46 eV), while PY13-FSI has the highest LUMO energy (about −0.81 eV), followed by PY13-TFSI with a LUMO energy of about −1.4 eV. FIG. 8 also lists HOMO energy values for electrolytes PP13-TFSI, PY13-TFSI, and PY13-FSI.

FIG. 9 shows a table listing multiple example embodiments of organic electrochemical cells (cases α-∈). In an example organic electrochemical cell described by case α, a cathode current collector is formed from aluminum, an anode current collector is formed from copper, an electrolyte is formed from PY13-TFSI, a binder is formed from carboxymethyl cellulose-PAA, a cathode is formed from calix[4]quinone, an anode is formed from disodium terephthalate, a separator is formed from polyolefin, and ions used in the organic electrochemical cell are sodium ions.

In another embodiment of the organic electrochemical cell, described by case the cathode current collector is formed from aluminum, the anode current collector is formed from copper, the electrolyte is formed from PY13-TFSI, the binder is formed from carboxymethyl cellulose-PAA, the cathode is formed from calix[4]quinone, the anode is formed from dipotassium terephthalate, the separator is formed from polyolefin, and ions used in the electrochemical cell are potassium ions.

In another embodiment of the organic electrochemical cell described by case γ, the cathode current collector is formed from aluminum, the anode current collector is formed from copper, the electrolyte is formed from PP13-TFSI, the binder is formed from peptidoglycan-polyacrylic acid biopolymer, the cathode is formed from benzoquinone, the anode is formed from dipotassium terephthalate, the separator is formed from polyolefin, and ions used in the electrochemical cell are potassium ions.

In another embodiment of the organic electrochemical cell described by case δ, the cathode current collector is formed from cytochrome c, the anode current collector is formed from cytochrome c, the electrolyte is formed from PP13-TFSI, the binder is formed from peptidoglycan-polyacrylic acid biopolymer, the cathode is formed from benzoquinone, the anode is formed from dipotassium terephthalate, the separator is formed from polyolefin, and ions used in the electrochemical cell are potassium ions.

Yet, in another embodiment of the organic electrochemical cell described by case E, the cathode current collector is formed from cytochrome c, the anode current collector is formed from cytochrome c, the electrolyte is formed from PP13-TFSI, the binder is formed from peptidoglycan-polyacrylic acid biopolymer, the cathode is formed from benzoquinone, the anode is formed from dipotassium terephthalate with the inclusion of graphene nanocomposite elements, the separator is formed from polyolefin, and ions used in the electrochemical cell are potassium ions.

In various implementations, adding graphene nanocomposite elements to the anode improves the electrical conductivity within the anode half-cell. In an example embodiment, any suitable graphene elements with high electrical conductivity may be used. It should be appreciated that conductive additives create additional conductive channels/paths via which electrons and ions can flow to the cathode. For example, such conductive additives may include graphene nanoribbons, graphene nanotubes (single wall, double-walled or multi-walled), carbon nanomaterials (e.g., carbon nanotubes), and the like. In an example embodiment, the chirality of graphene nanotubes is selected to provide conductive nanotubes. It should be appreciated that, in some cases, multiple graphene elements (e.g., graphene sheets stacked to form graphite nano-sized elements) may be used. In some cases, other carbon structures may be used (e.g., fullerenes such as buckyballs, bucky onions, fullerites, carbon nanotube graphene structures, and the like).

In an example embodiment, the weight fraction of graphene nanocomposite elements (GNE) may be a few percent of the weight of dipotassium terephthalate. For example, GNE may be 2% of the weight of dipotassium terephthalate, 3% of the weight of dipotassium terephthalate, 4% of the weight of dipotassium terephthalate, 5% of the weight of dipotassium terephthalate, 6% of the weight of dipotassium terephthalate, 7% of the weight of dipotassium terephthalate, 8% of the weight of dipotassium terephthalate, 9% of the weight of dipotassium terephthalate, 10% of the weight of dipotassium terephthalate, 11% of the weight of dipotassium terephthalate, 12% of the weight of dipotassium terephthalate, 13% of the weight of dipotassium terephthalate, 14% of the weight of dipotassium terephthalate, 15% of the weight of dipotassium terephthalate, 16% of the weight of dipotassium terephthalate, 17% of the weight of dipotassium terephthalate, 18% of the weight of dipotassium terephthalate, 19% of the weight of dipotassium terephthalate, or as much as 20% of the weight of dipotassium terephthalate. It should be appreciated that GNE is only one possible additive and other conductive additives may be used. It should be noted that in some implementations, conductive additives may be also added to the cathode half-cell of the organic electrochemical cell.

It should be appreciated that, in some embodiments, a combination of various elements may be used. For example, anode 122 may be a combination of materials (e.g., a combination of K2TP and K2NDC). Further, cathode 112 may be a combination of different quinone compounds (e.g., a combination of benzoquinone and/or anthraquinone and/or naphthodiquinone). Further, binder 113 may be formed from multiple compounds (e.g., a combination of carboxymethyl cellulose-PAA and peptidoglycan-polyacrylic acid biopolymer).

Organic electrochemical cells described herein, such as OEC 100 and OEC 200, may be configured to operate in a manner that is similar to that of lithium-ion technology, however OECs described herein do not depend on a cation of a compound that is used for the cathode. This lack of dependency results in a variety of quinone compounds being acceptable for use with (i.e., compatible with) the OEC, and the OEC may be configured to transport sodium ions, magnesium ions, or potassium ions. An example OEC of case α, in which the cathode includes calix[4]quinone (C28H16O8), the electrolyte includes PY13-TFSI (C10H18F6N2O4S2) ionic liquid, and the anode includes disodium terephthalate (C8H4Na2O4), provides an energy density of 160 Wh/kg and has been shown to have a capacity retention of about 99.7% at 130 mA/g for 300 cycles. Such performance is comparable to that of a lithium-ion battery. For example, a high-performing lithium-ion battery has an energy density of 265 Wh/kg, while a low-performing lithium-ion battery may have an energy density of about 100 Wh/kg. Another example OEC of case E incorporates dipotassium terephthalate (C8H4K2O4) in the anode instead of di sodium terephthalate. Such an OEC may exhibit a very high energy density, e.g., of about 467 Wh/kg. It should be noted that, while voltage may be relatively defined for a given compound, charge storage capacity can vary depending on components and other factors (e.g., environmental factors).

In various embodiments, organic electrochemical cells discussed herein can be used for forming electrochemical cells using any of a variety of suitable techniques. For example, organic electrochemical cells may be fabricated from stacked layers of materials, and the stacked layers may be rolled into a cylinder, thereby forming a cylindrical electrochemical cell. In an example embodiment, a cathode and an anode may collectively form layers with thicknesses of between about 40 microns and about 70 microns with all the values and ranges in between. Additionally, or alternatively, electrochemical cells may be fabricated as pouch electrochemical cells or prismatic electrochemical cells.

Example Calculation of Theoretical Charge Storage Capacity Using Organic Materials For the calix[4]quinone (C4Q) cathode, redox potential (voltages) is established to range between 1.2 to 3.7 Volts (V). Since the charge storage capacity is typically higher than experimentally observed value, a low value of 1.2 V may be used for the redox potential. The number of exchanged electrons (n) may be six to eight electrons, depending on the type of ions (e.g., sodium ions or potassium ions) present. For example, for sodium ions it has been determined to be eight (see, Wang, et. al. "Combining Quinone Cathode and Ionic Liquid Electrolyte for Organic Sodium-Ion Batteries." Chem 5, no. 2 (Feb. 14, 2019): 364-75). The theoretical charge storage capacity is then calculated by multiplying eight (number of exchanged electrons) with Faraday's constant in mAh (milliampere×hour) and dividing that number by the molar mass of C4Q (480.4 g/mol), resulting in 446 mAh/g (theoretical storage capacity $C=n\cdot F/M$, where n is the number of electrons involved in redox reaction, F is the Faraday constant of $F=96485.3329$ s·A/mol=26801 mAh/mol, and M is a molecular weight of the electroactive material). The energy density is calculated as $E=V\times C$, where V is redox potential and C is the theoretical storage capacity. For C4Q cathode, V=1.2 V, and C=446 mAh/g, thus, energy density E=1.2×446=535 Wh/kg.

Similarly, for benzoquinone cathode, theoretical capacity is calculated to be about 287 mAh/g, and voltage for benzoquinone is calculated to be about 2.8V resulting in energy density $E_{BENZ}$ of about 803 Wh/kg.

For the dipotassium terephthalate anode redox potential (voltages) is established to be about 0.6 volts. For the anode, the theoretical storage capacity is calculated in the same way as for cathode, except the molar mass of dipotassium terephthalate $M_{K2TP}$ is used ($M_{K2TP}$=242.312 g/mol). For dipotassium terephthalate, only two electrons are involved in redox reaction. Thus, energy density of dipotassium terephthalate is $E_{K2TP}$~0.6 26801·2/243=132 Wh/kg.

When benzoquinone is used for cathode and dipotassium terephthalate is used for anode, the energy density may be estimated to be the average energy density $E=(E_{BENZ}+E_{K2TP})/2=(803+132)/2=467$ Wh/kg.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An organic electrochemical cell, comprising:
   a cathode including a quinone compound;
   an anode including dipotassium terephthalate;
   an electrolyte;
   a separator disposed between the anode and the cathode; and
   a binder that is part of the anode and the cathode, the binder including a peptidoglycan-polyacrylic acid biopolymer and configured to prevent damage to the cathode and the anode during an operation of the organic electrochemical cell,
   the organic electrochemical cell configured such that, during a discharging operation, potassium ions travel through the separator and the electrolyte to the cathode.

2. The organic electrochemical cell of claim 1, wherein the quinone compound includes one of an anthraquinone, a benzoquinone, or a naphthodiquinone.

3. The organic electrochemical cell of claim 1, wherein the cathode includes benzoquinone.

4. The organic electrochemical cell of claim 3, wherein the benzoquinone is 1,4 benzoquinone.

5. The organic electrochemical cell of claim 1, wherein the electrolyte is one of N-Methyl-N-propylpiperidinium bis(trifluoromethanesulfonyl)imide (PP13-TFSI), N-Methyl-N-propylpyrrolidinium bis(trifluoromethylsulfonyl)imide (PY13-TFSI), or N-Methyl-N-Propylpyrrolidinium bis(fluorosulfonyl)imide (PY13-FSI).

6. The organic electrochemical cell of claim 1, wherein the separator includes polyolefin.

7. The organic electrochemical cell of claim 1, further comprising a cathode current collector and an anode current collector, wherein the cathode current collector is adjacent to the cathode and electrically coupled to the cathode, and wherein the anode current collector is adjacent to the anode and electrically coupled to the anode.

8. The organic electrochemical cell of claim 7, wherein the cathode current collector includes aluminum.

9. The organic electrochemical cell of claim 7, wherein the anode current collector includes copper.

10. The organic electrochemical cell of claim 7, wherein one of the anode current collector or the cathode current collector includes graphite.

11. The organic electrochemical cell of claim 7, wherein at least one of the cathode current collector or the anode current collector includes a cytochrome complex.

12. The organic electrochemical cell of claim 11, wherein the cytochrome complex is heme-rich.

13. The organic electrochemical cell of claim 11, wherein the cytochrome complex is a tetraheme cytochrome complex.

14. The organic electrochemical cell of claim 1, wherein the anode further includes graphene nanocomposite elements.

15. The organic electrochemical cell of claim 1, wherein the anode has a thickness of 40-70 microns along a first dimension of the organic electrochemical cell, and the cathode has a thickness of 40-70 microns along the first dimension of the organic electrochemical cell.

16. An organic electrochemical cell comprising:
   a cathode including a quinone compound;
   an anode including dipotassium terephthalate;
   an electrolyte;
   a separator disposed between the anode and the cathode;
   a cathode current collector; and
   an anode current collector,
   each of the cathode current collector and the anode current collector including a cytochrome complex, and
   the organic electrochemical cell configured such that, during a discharging operation, potassium ions travel through the separator and the electrolyte to the cathode.

17. The organic electrochemical cell of claim 16, wherein at least one of the anode or the cathode comprises a binder including peptidoglycan-polyacrylic acid biopolymer.

18. The organic electrochemical cell of claim 16, wherein the electrolyte is one of N-Methyl-N-propylpiperidinium bis(trifluoromethanesulfonyl)imide (PP13-TFSI), N-Methyl-N-propylpyrrolidinium bis(trifluoromethylsulfonyl)imide (PY13-TFSI), or N-Methyl-N-Propylpyrrolidinium bis(fluorosulfonyl)imide (PY13-FSI).

19. An organic electrochemical cell, comprising:
a cathode including a quinone compound;
an anode including dipotassium terephthalate;
an electrolyte;
a separator disposed between the anode and the cathode; and
a cathode current collector and an anode current collector, the cathode current collector adjacent to the cathode and electrically coupled to the cathode, and the anode current collector adjacent to the anode and electrically coupled to the anode, at least one of the cathode current collector or the anode current collector including a cytochrome complex,
the organic electrochemical cell configured such that, during a discharging operation, potassium ions travel through the separator and the electrolyte to the cathode.

* * * * *